Aug. 6, 1968   P. T. MARTIN ET AL   3,396,275
IONIZATION TYPE RADIATION DETECTOR
Filed Aug. 24, 1964   2 Sheets-Sheet 1
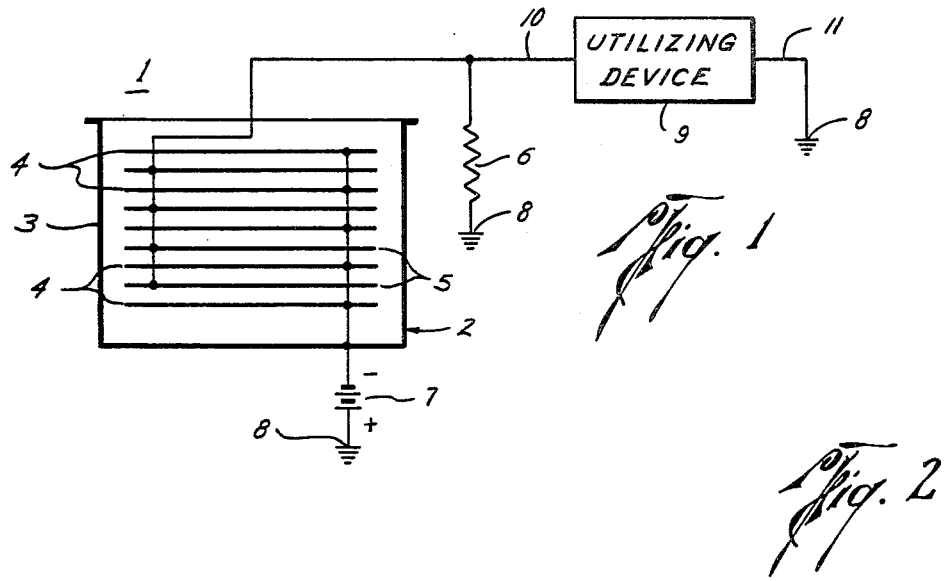
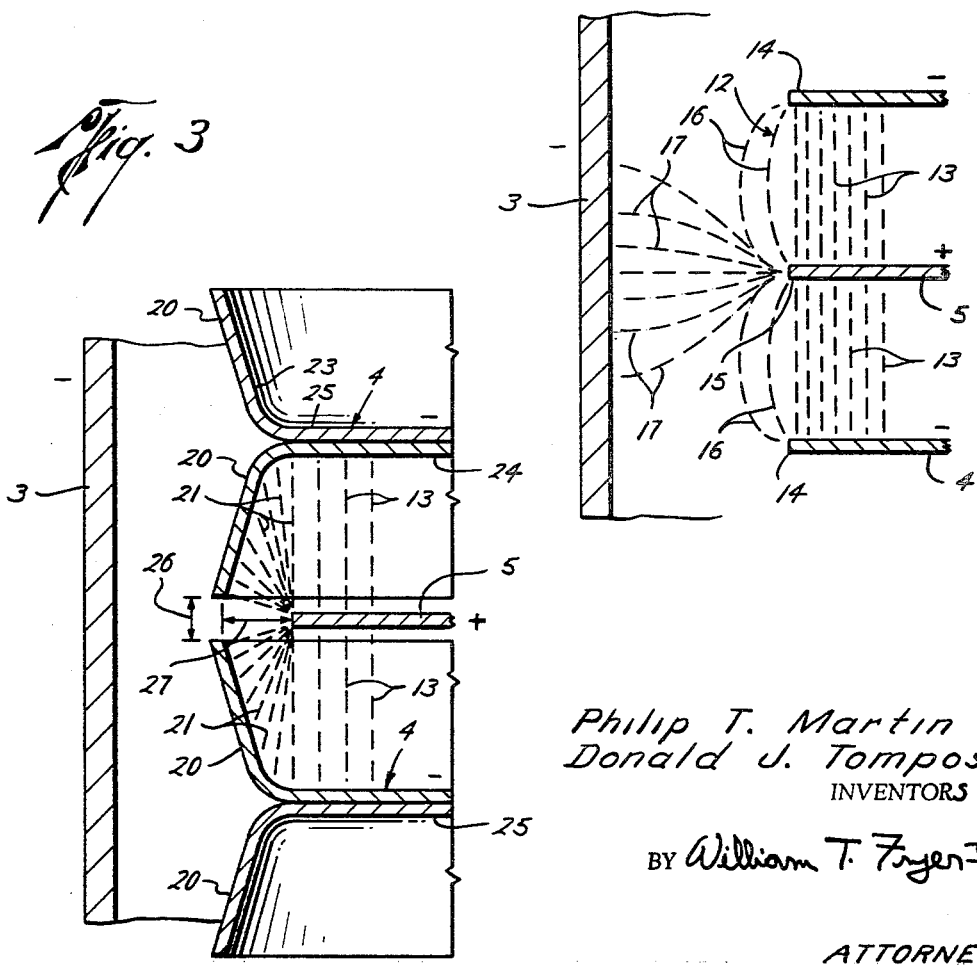
Philip T. Martin
Donald J. Tompos
INVENTORS
BY William T. Fryer III
ATTORNEY Philip T. Martin
Donald J. Tompos
INVENTORS BY William T. Fryer III

ATTORNEY 3,396,275
IONIZATION TYPE RADIATION DETECTOR
Philip T. Martin, Columbus, and Donald J. Tompos,
  Worthington, Ohio, assignors to Industrial Nucle-
  onics Corporation, a corporation of Ohio
Filed Aug. 24, 1964, Ser. No. 391,719
24 Claims. (Cl. 250—83.6)

ABSTRACT OF THE DISCLOSURE

An ionization chamber designed for improved temperature stability. The chamber includes a metallic housing, voltage electrodes that are circular plates and spaced apart. The same potential is applied to the voltage electrodes and the housing. An ionizable gas is sealed in the housing. A signal electrode, also a circular plate, is disposed between the voltage electrodes, and is at a different potential. The electric field at the end of the voltage and signal electrodes, adjacent the housing, is maintained high, by a lip about the circumference of the voltage electrodes that embraces the end of the signal electrode.

---

The present invention is related to devices for measuring radiation intensity and, more particularly, to an improvement in radiation devices that utilize the ionization of a gas to produce a current having a functional relationship with radiation intensity.

There are many applications for a radiation detector. As well known in the art, radiation detectors are combined with sources of radiation to measure various material characteristics. A typical example of such a combination is the beta ray thickness gauge having a source of radiation on one side of the material and detector on the opposite side for measuring the intensity of the radiation transmitted through the material. Another form of gauge utilizes the backscatter of radiation from a material to measure such characteristics as coating thickness, hardness, or weight per unit area. In each of these arrangements a very important part of the gauge is the detector which transforms or transduces the radiation intensity into an electrical signal, either a voltage or a current, that can be transmitted to a utilizing device. The electrical signal can be measured to indicate the amount of the characteristic being sensed, and/or the signal can be used to actuate a control device for maintaining the characteristic at some desired level.

In each of the above-mentioned apparatus arrangements, radiation intensity must be transformed into an electrical signal and the signal must not vary due to any factor except the radiation intensity. Other influences on the signal do exist and one of the most troublesome is the air temperature around the detector. Many gauges must be installed on lines where the material is at an elevated temperature and the detector is exposed to great variations in temperature.

The reliability of a detector under varying temperature conditions is rated by a term generally called "temperature coefficient." The temperature around the detector can be varied while the radiation intensity is constant and the percent change in the detector output signal for a given temperature range represents the temperature coefficient for the detector. The object in designing a detector is to have a minimum temperature coefficient, hopefully zero.

Many detectors exhibit an appreciable temperature coefficient and must be provided with an external compensating means. For example, a temperature-sensitive resistance, that responds to the variations in temperature around the detector, can be inserted in a circuit of the utilizing device to compensate for changes in the signal due to temperature. It is desirable to avoid the use of such a circuit-compensating arrangement by having a detector that exhibits a very small temperature coefficient.

A detector of the type that relies on the ionization of a gas to produce the signal that is a function of the radiation intensity is very dependent on temperature unless adequate techniques are employed to eliminate all causes of variations in the signal due to temperature. Even with careful application of all these techniques, it was not certain that each detector would have a satisfactory temperature coefficient and each detector had to be checked carefully over an extended period.

The design of an ionization-type radiation detector has taken many forms in the prior art. In general, the ionization-type detector utilized a chamber containing a gas and two or more electrodes at different electric potentials. When the radiation entered the detector the gas ionized and produced a flow of current which, when the electrodes were connected to a utilizing device, caused a current to flow from the detector that was a function of the radiation intensity. The ionization-type detector could be arranged to measure any type of radiation, gamma, beta, alpha, X-rays, neutrons, for example. Many of these detectors exhibited a high temperature coefficient.

Recognizing the limitations in the prior art ionization-type detectors, the present invention has for one of its objects to provide method and apparatus for minimizing the temperature coefficient of an ionization-type detector.

It is a further object of the present invention to provide an ionization-type radiation detector that is simple to construct and relatively inexpensive, while still exhibiting a very small, if any, change in signal with temperature variations.

It has been discovered that one of the main reasons for a high temperature coefficient in an ionization-type detector is the presence of weak fringe electric fields adjacent the end of the electrodes. In a weak electric field, where recombination of charged particles may occur, the change in temperature appreciably influences the rate of recombination. Charge particles attracted to the electrodes form the current producing the detector signal and any change in the percent of recombination directly changes the signal. The present invention provides method and apparatus for modifying the fringe electric field adjacent the end of the electrodes to substantially reduce recombination. The fringe field can be increased, for example, by (1) increasing the potential difference between the electrodes, or (2) the spacing at the end of the electrodes can be modified to retain a high electric field. Of particularly unique significance is the modification of the fringe electric field to produce saturation operation, i.e., collection of all the charged particles with no appreciable recombination. With saturation operation any change in temperature has only a small, if any, effect on the number of charged particles that are collected and the detector signal is substantially insensitive to temperature variations. At less than saturation operation any increase in the fringe electric field at the ends of the electrodes improves (reduces) the temperature coefficient. The fringe electric field at the end of the electrodes can be adjusted by having one of the electrodes at least patrially surround the other electrodes to produce a greater electric field and decrease in recombination, preferably saturation operation. In an ionization-type detector having a metallic casing which is at the same potential as one of the electrodes, the one electrode has a lip that extends between the casing and the other electrode to increase the fringe electric field.

The methods and apparatuses for practicing the present invention are illustrated by the following description of a preferred embodiment, reference being made to the drawings, wherein, FIG. 1 is an example of a prior art ionization-type detector connected in an operating circuit and to a utilizing device.

FIG. 2 is an enlarged view of the electrodes in the ionization-type detector shown in FIG. 1 for illustrating the disposition of the fringe electric field at the electrode end.

FIG. 3 is an enlarged view, similar to FIG. 2, of one embodiment of an improved, low temperature coefficient ionization-type detector in accordance with the present invention.

Figure 4:
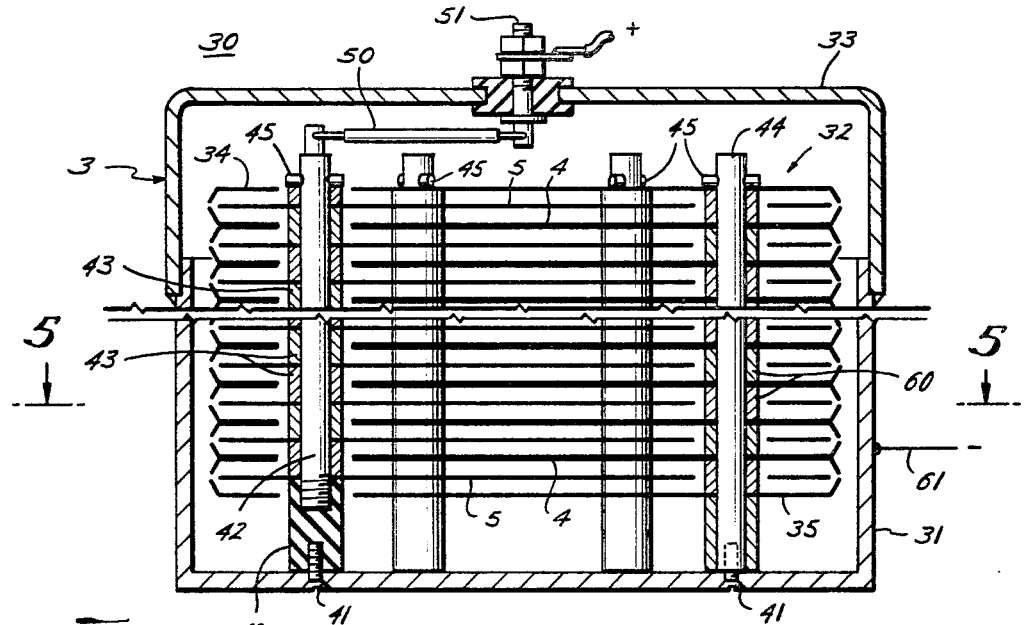
FIG. 4 is an elevation, cross-section view of one embodiment of an ionization-type detector having multiple electrodes with the electrode end configuration as shown in FIG. 3, in accordance with the present invention.

The example prior art ionization-type radiation detector 1 (FIG. 1) is capable of providing a substantial signal that is a function of radiation intensity impinging thereon. The basic arrangement of detector 1 includes a sealed chamber 2 constructed of a metallic housing or casing 3 having electrodes 4 and 5 spaced apart and supported therein (support means is omitted from the figure for clarity). Electrodes 5 are connected together electrically and to one side of a resistor 6, generally termed a high-meg resistor. Electrodes 4 are connected together and to the casing 3 electrically. A potential difference is supplied by power source 7, here represented as a battery, with a negative potential on electrodes 4 and a positive potential on electrodes 5. The other side of high-meg resistor 6 is connected to ground 8, as is the positive side of power source 7, to complete the electrical circuit from the detector 1 through the high-meg resistor 6 and power source 7. The detector signal, which is a function of the radiation intensity, is developed across high-meg resistor 6 and coupled to utilizing device 9, having one input 10 connected to the ungrounded side of high-meg resistor 6 and the other input 11 connected to ground 8.

Within chamber 2 is an ionizable gas that is present between electrodes 4 and 5 and between casing 3 and the end of electrodes 4 and 5. Electrodes 4 and 5 are at a different potential and the charge particles produced by the radiation cause a current to flow through the circuit including high-meg resistor 6 to develop the detector signal. Increased radiation intensity produces more charged particles and, accordingly, the detector signal increases.

Ionization-type detectors, such as detector 1, have been constructed for very efficient, high output operation, but the presence of variations in the output signal due to temperature has always been a considerable problem. Every conceivable technique was employed to minimize the temperature coefficient and still some detectors did not prove satisfactory. Detectors that were affected by temperature could not be tolerated in many cases and the treatment and testing of detectors until a satisfactory one was found greatly increased the cost of the detector.

As mentioned briefly above, after investigating the problem of temperature variations changing the output signal, it was discovered that one of the primary causes of the change in output signal was the presence of weak electric fields in the fringe region at the end of the electrodes. Charged particles from this region formed part of the detector current for the output signal. Normally, the potential difference between electrodes 4 and 5 was adjusted to provide saturation operation, i.e., ionization current which resulted when the applied potential difference was sufficient to collect all charged particles formed between the electrodes and no appreciable recombination occurs. No consideration was given to the action taking place adjacent the electrode ends.

It was not known in the art that the potential difference could be adjusted to minimize temperature coefficient by eliminating or substantially minimizing the regions of weak electric field adjacent the end of the electrodes. For example, in detector 1, electric field 12 (FIG. 2) is uniform and at a high intensity between electrodes 4 and 5, as represented by the closely spaced straight, dash lines 13. Electric field 12 at the ends of the electrodes, generally designated as 14 and 15, decreases rapidly as represented by the wider spaced, curved dash lines 16. The weaker intensity field 16 is just what allows changes in the detector signal because of temperature variations. Even if the electric field 13 between electrodes 4 and 5 is sufficient for saturation operation, electric field 16 may not be, and not all the charged particles produced are collected. The rate of recombination of the charged particles is a function of temperature and, at very low electric field intensity a significant variation in recombination rate occurs with change in temperature.

Electric field 12 also has a component electric field 17 set up between the casing 3 and electrodes 5, since there is a difference in potential. There is no appreciable electric field between casing 3 and electrodes 4, since the potential difference is substantially zero. The region containing electric field 17 also is highly susceptible to changes in temperature, since the electric field intensity is relatively weak and allows change in output signal due to temperature variations.

It is apparent, through the above analysis, that the fringe or weaker electric fields within the ionization-type detector are responsible to a large extent for variations in output signal due to temperature. Where temperature coefficient is very important, one method of the present invention is to adjust the electric field intensity beween electrodes 4 and 5 to minimize the portion of the region adjacent the ends of the electrodes that are in a weak electric field. The potential difference can be increased, for a given electrode spacing, beyond the saturation potential to an extent necessary for the desired temperature coefficient. Alternatively, for a given potential difference between the electrodes, the spacing at the end of the electrodes can be modified to retain a high intensity electric field. For example, one of the electrodes can be formed or constructed in such a manner that it embraces or at least partially surrounds the other electrode, thereby retaining the high intensity electric field and providing a region of less recombination, preferably saturation operation. It has been found particularly advantageous to modify the electrode(s) having the negative potential, since it is the electrons drawn to the electrode having the positive potential that constitute the current. The electrode with the negative potential, electrodes 4 in the example embodiment, is termed the "voltage electrode" and the electrode with the positive potential, electrodes 5 in the example embodiment, is termed the "signal" electrode. The signal electrodes are connected to one end of the high-meg resistor 6.

One of the above-mentioned approaches for modifying the electric field intensity in the fringe region adjacent the end of the electrodes 4 and 5 is illustrated in FIG. 3. Electrodes 4 have been changed to a configuration including metallic lips 20 that at least partially surround or embrace electrode 5, partially in between electrode 5 and casing 3. Electric field 13 does not change. However, the fringe electric fields 16 and 17 are changed, in fact substantially eliminated, producing a high intensity electric field 21 that is sufficient to produce less recombination of charged particles, preferably, saturation operation. The region within chamber 2 having a weak fringe electric field has been substantially reduced, since lips 20 are at the same potential as casing 3. Signal electrodes 5 receive substantially all of the electrons forming the output signal current from a region of high electric field intensity where the effect of variations in temperature is substantially insignificant. It is apparent that other configurations of electrode ends may be employed to modify the electric field. Alternatively, the casing 3 can be formed or shaped, with respect to the electrodes, to substantially eliminate the weak fringe electric fields.

The arrangement of electrodes 4 as shown in FIG. 3 has a unique advantage from the standpoint of constructing a low-cost, rugged and low temperature coefficient ionization-type detector. Each of the electrodes 4 is formed by the combination of two component parts, metal plates 23 and 24. Each of plates 23 and 24 is cup-shaped having lip 20 entirely around its circumference with a flat bottom 25. As viewed in a vertical plane with plates 23 and 24 horizontal (FIG. 3), lips 20 extend beyond electrodes 5 in a horizontal direction and then turn upward or downward to at least partially come between one of electrodes 5 and casing 3. At any one electrode 5, the immediately adjacent lips 20 extend toward each other to form a small gap 26, which can approach the width (vertical dimension) of electrode 5. Lips 20 overlie electrode 5 by a distance 27, which varies depending on the desired electric field intensity. As shown, electric field 21 is appreciably greater than electric field 13 and, since saturation operation is produced by electric field 13, electric field 21 is adequate to provide saturation operation in a large portion of the region adjacent the end of electrode 5. Plates 23 and 24 of electrodes 4 are in electrical contact, either by welding or by an arrangement to be described in connection with FIG. 4. The same negative potential is applied to casing 3 and electrodes 4 by a suitable terminal means and electrical connection therebetween and a different potential, shown here as positive, is applied to the electrodes 5 by a suitable terminal means.

Figure 5:
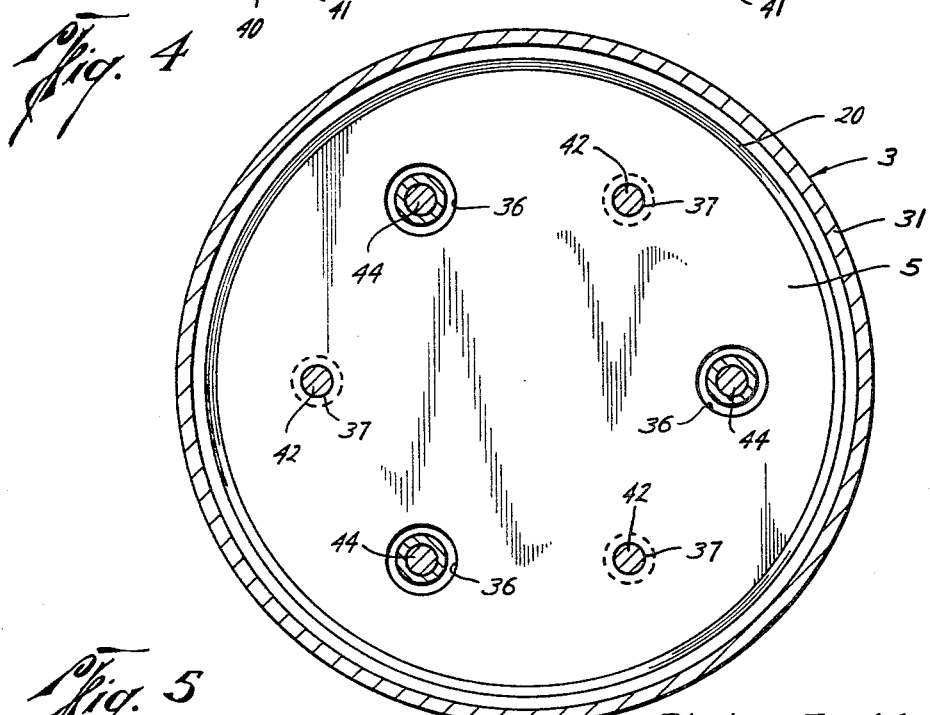
FIG. 5 is a horizontal, section view along the lines 5—5 of FIG. 4.

A multi-electrode, high output signal ionization-type detector 30 (FIGS. 4 and 5) utilizes the electrodes 4 and 5 as described above to minimize temperature coefficient. Detector 30 includes a cylindrical shell base 31 constructed of metal which supports the electrode stack 32. Base 31, and a cylindrical shell cover 33, welded thereto, form casing 3. Electrode stack 32 is an arrangement of electrodes 4 and 5, as previously described, with the addition of voltage plate 34 at the upper end and a voltage plate 35 at the lower end having their respective lips at least partially embracing the adjacent signal electrodes 5. Each of the electrodes 4 and its component parts, plates 23 and 24, are generally circular, as best shown in FIG. 5, and bottoms 25 of plates 23 and 24 constitute a large surface area and are generally parallel. In the same manner, signal electrodes 5 are circular discs of large surface area, generally parallel with each other and with the bottoms 25 of electrodes 4.

Electrode stack 32 is assembled very easily by having the same construction features for each of electrodes 4, 5, 34, and 35. Since each of these electrodes is circular in shape, two sets of holes 36 and 37 are drilled, each hole lying on a circle drawn about the center of the plate or electrode. Each electrode has three holes in each of sets 36 and 37, alternately spaced at sixty degree intervals on the circle. The holes of set 36 are larger than the holes of set 37, for a reason to be described later. Three insulators 40 are fastened to the bottom of base 31 by means of screws 41 and disposed on a circle to receive at their upper end, in threaded engagement, a metal post 42. The electrodes are stacked, starting at the bottom with electrode 35. The first one of electrodes 5 is separated by a bushing formed by part of insulator 40. Next, one of electrodes 4 is stacked, separated by a metal bushing 43. The electrode stack 32 is also supported by means of another metal post 44 fastened to the bottom of base 31 by screws 41. There are three metal posts 44 that are spaced also on the circle to sit within the holes of set 36. A bushing 45 on post 44 separates voltage electrode 35 and the bottom of base 31 and metal bushings 60 are placed on post 44 to separate the voltage electrodes 44. The electrode stack 32 is completed by the voltage electrode 34 and pins 45 extend through the posts 42 and 44 to secure the electrodes in a rigid assembly.

The electric potential to the various electrodes are supplied by means of terminal connections. The voltage electrodes 4, 34, and 35 are connected together electrically by means of posts 44 and bushings 60 into the casing 3. The negative potential is applied at terminal 61 attached to the base 31. Signal electrodes 5 are connected together by means of posts 42 and bushings 43, but insulated from casing 3 and signal electrodes 4, 34, and 35 by insulator 40 and/or air gaps. The upper end of post 42 adjacent voltage electrode 34 is connected by means of insulated wire 50 to a binding post 51 mounted in and insulated from cover 33. The positive potential for signal electrodes 5 is connected to binding post 51.

While only one preferred embodiment of a multi-electrode ionization-type detector has been described, it is apparent that other embodiments can be constructed in accordance with the present invention. The reference to potentials, either positive or negative, in the above description is merely by way of example, since the electrode potentials are a matter of choice, the only criteria being that the potentials be different and of sufficient magnitude to produce the desired operation. The number of electrodes in any one ionization-type detector is also a matter of choice, as is the particular mounting arrangement for stacking the electrodes. A detector embodying the present invention can be designed to receive any type of radiation or energy range, in accordance with the prior art techniques. The scope of the present invention is defined by the claims which are appended hereto.

What is claimed is:

1. A multi-electrode radiation detector, comprising a sealed chamber, a first electrode in said chamber, second and third electrodes supported in spaced relation on opposite sides of said first electrode in said chamber, an ionizable gas in said chamber, said first electrode to have a potential different from said second and third electrodes to establish between said electrodes a region with an electric field to collect charged particles produced by ionization of said gas for the production of a current, the current being a function of the radiation intensity and to be connected to an utilizing device, the improvement comprising, said means for increasing the electric field intensity adjacent the ends of said electrodes to reduce recombination of the charged particles.

2. A multi-electrode radiation detector, comprising a sealed chamber, a first electrode in said chamber, second and third electrodes supported in spaced relation on opposite sides of said first electrode in said chamber, an ionizable gas in said chamber, said first electrode to have a potential different from said second and third electrodes to establish between said electrodes a region with an electric field to collect charge particles produced by ionization of said gas for the production of a current, the current being a function of the radiation intensity and to be connected to an utilizing device, the improvement comprising, said second and third electrodes having ends that at least partially extend around the end of said first electrode to maintain a high intensity electric field adjacent the end of said first electrode.

3. A multi-electrode radiation detector, comprising a sealed chamber, a first electrode in said chamber, second and third electrodes supported in spaced relation on opposite sides of said first electrode in said chamber, an ionizable gas in said chamber, said first electrode to have a potential different from said second and third electrodes to establish between said electrodes a region with an electric field to collect charged particles produced by ionization of said gas for the production of a current, the current being a function of the radiation intensity and to be connected to an utilizing device, the improvement comprising, said first electrode being a plate, each of said second and third electrodes being a plate having a circumferential lip extending to at least partially surround the end of said first electrode, there being a gap between the lips of said second and third electrodes about the same dimension as the width of said first electrode.

4. A multi-electrode radiation detector, comprising a sealed chamber, a first electrode in said chamber, second and third electrodes supported in spaced relation on opposite sides of said first electrode in said chamber, an ionizable gas in said chamber, power source means connected between said first electrode and said second and third electrodes to establish between said first electrode and said second and third electrodes a region with an electric field to collect charged patricles produced by saturation operation for the production of a current, the current being a function of the radiation intensity and to be connected to an utilizing device, the improvement comprising, means for increasing the electric field intensity adjacent the ends of said electrodes to minimize the portion of said region that has less than saturation operation.

5. A multi-electrode radiation detector, comprising a sealed chamber, a first electrode in said chamber, second and third electrodes supported in spaced relation on opposite sides of said first electrode in said chamber, an ionizable gas in said chamber, power supply means connected between said first electrode and said second and third electrodes to establish between said first electrode and said second and third electrodes a region with an electric field to collect charged particles produced by saturation operation for the production of a current, the current being a function of the radiation intensity and to be connected to an utilizing device, the improvement comprising, said second and third electrodes having ends that at least partially extend around the end of said first electrode to maintain a high intensity electric field for saturation operation adjacent the end of said first electrode.

6. A multi-electrode radiation detector, comprising a sealed chamber, a first electrode in said chamber, second and third electrodes supported in spaced relation on opposite sides of said first electrode in said chamber, an ionizable gas in said chamber, said first electrode to have a potential different from said second and third electrodes to establish between said first electrode and said second and third electrodes a region with an electric field to collect charged particles produced by saturation operation for the production of a current, the current being a function of the radiation intensity and to be connected to an utilizing device, the improvement comprising, said first electrode being a plate, each of said second and third electrodes being a plate having a circumferential lip extending inwardly, towards said first electrode, to at least partially surround the end of first electrode, there being a gap between the lips of said second and third electrodes about the same dimension as the width of said first electrode the aforesaid arrangement reducing recombination at the end of said first electrode, the spacing between the end of said first electrode and said lips being sufficient to establish substantially saturation operation.

7. An improved radiation detector having a low temperature coefficient, comprising, a sealed chamber filled with ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, said casing, second and third electrodes to have a potential different from said first electrode to establish between said electrodes a region with an electric field to collect charged particles produced by ionization of said gas for the production of a current, the current being a function of the radiation intensity and to be connected to an utilizing device, the improvement comprising, means for maintaining a high intensity electric field adjacent the ends of said electrodes to reduce recombination of the charged particles.

8. An improved radiation detector having a low temperature coefficient, comprising, a sealed chamber filled with an ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, said casing, second and third electrodes to have a potential different from said first electrode to establish between said electrodes a region with an electric field to collect charged particles produced by ionization of said gas for the production of a current, the current being a function of the radiation intensity and to be connected to an utilizing device, the improvement comprising, said second and third electrodes having ends that at least partially extend around the end of said first electrodes to maintain a high electric field adjacent said first electrode.

9. An improved radiation detector having a low temperature coefficient, comprising, a sealed chamber filled with an ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, said casing, second and third electrodes to have a potential different from said first electrode to establish between said electrodes a region with an electric field to collect charged particles produced by ionization of said gas for the production of a current, the current being a function of the radiation intensity and to be connected to an utilizing device, the improvement comprising, said first electrode being a plate, each of said second and third electrodes being a plate having a circumferential lip extending to at least partially surround the end of said first electrode, there being a gap between the lips of second and third electrodes having about the same dimension as the width of said first electrode, the arrangement as aforesaid maintaining a high electric field around said first electrode in the region adjacent said casing.

10. An improved radiation detector having a low temperature coefficient, comprising, a sealed chamber filled with an ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, power source means connected between said first and said second and third electrodes to establish between said first and second and third electrodes a region with an electric field to collect charged particles produced by saturation operation for the production of a current, the current being a function of the radiation and to be connected to an utilizing device, the improvement comprising, means for maintaining a high intensity electric field adjacent the ends of said electrodes to minimize the portion of said region that has less than saturation operation.

11. An improved radiation detector having a low temperature coefficient, comprising, a sealed chamber filled with an ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, power source means connected between said first and said second and third electrodes to establish between said first and second and third electrodes a region with an electric field to collect charged particles produced by saturation operation for the production of a current, the current being a function of the radiation and to be connected to an utilizing device, the improvement comprising, said second and third electrodes having ends that at least partially extend around the end of said first electrodes to maintain a high electric field for saturation operation adjacent the end of said first electrode.

12. An improved radiation detector having a low temperature coefficient, comprising, a sealed chamber filled with an ionizable gas, said chamber comprising a metallic casing, at least one first electrode supported within and electrically insulated from said casing, at least second and third electrodes supported within said casing on opposite sides of said first electrode in electrical contact with said casing, the ends of each of said electrodes being adjacent said casing, said casing, second and third electrodes to have a potential different from said first electrode to establish between said first and second and third electrodes a region with an electric field to collect charged particles produced by saturation operation for the production of a current, the current being a function of the radiation and to be connected to an utilizing device, the improvement comprising, said first electrode being a plate, each of said second and third electrodes being a plate having a circumferential lip extending inwardly, towards said first electrode, to at least partially surround the end of said first electrode, there being a gap between the lips of said second and third electrodes having about the same dimension as the width of said first electrode, the arrangement reducing recombination at the end of said first electrode, the spacing between the end of said first electrode and said lips being sufficient to establish substantially saturation operation.

13. A radiation detector, comprising, a sealed chamber filled with an ionizable gas, said chamber comprising a metallic casing, at least one first electrode supported within and electrically insulated from said casing, at least one second electrode supported within said casing on one side of said first electrode in electrical contact with said casing, the ends of each of said first and second electrodes being adjacent said casing, power source means connected between said first and said second electrodes, to establish a region with an electric field to collect charged particles produced by saturation operation for the production of a current, the current being a function of the radiation and to be connected to a utilizing device, the improvement comprising, means for increasing the electric field intensity adjacent the ends of said electrodes to produce saturation operation in a substantial portion of the region adjacent said first electrode end.

14. A radiation detector, comprising, a sealed chamber filled with an ionizable gas, said chamber comprising a metallic casing, at least one first electrode supported within and electrically insulated from said casing, at least one second electrode supported within said casing on one side of said first electrode in electrical contact with said casing, the ends of each of said first and second electrodes being adjacent said casing, power source means connected between said first and said second electrodes to establish a region with an electric field to collect charged particles produced by saturation operation for the production of a current, the current being a function of the radiation and to be connected to a utilizing device, the improvement comprising, said second electrode having an end that at least partially extends around the end of said first electrode, to increase the electric field intensity sufficiently for saturation operation in a substantial portion of the region adjacent said first electrode end.

15. A radiation detector, comprising, a sealed chamber filled with an ionizable gas, said chamber comprising a metallic casing, at least one first electrode supported within and electrically insulated from said casing, at least one second electrode supported within said casing on one side of said first electrode in electrical contact with said casing, the ends of each of said first and second electrodes being adjacent said casing, said casing and second electrode to have a potential different from said first electrode to establish a region with an electric field to collect charged particles produced by ionization of said gas for the production of a current, the current being a function of the radiation intensity and to be connected to a utilizing device, the improvement comprising, means for increasing the electric field intensity adjacent the ends of said electrodes to reduce recombination of the charged particles.

16. A radiation detector, comprising, a sealed chamber filled with an ionizable gas, said chamber comprising a metallic casing, at least one first electrode supported within and electrically insulated from said casing, at least one second electrode supported within said casing on one side of said first electrode in electrical contact with said casing, the ends of each of said first and second electrodes being adjacent said casing, said casing and second electrode to have a potential different from said first electrode to establish a region with an electric field to collect charged particles produced by ionization of said gas for the production of a current, the current being a function of the radiation intensity and to be connected to a utilizing device, the improvement comprising, said second electrode having an end that at least partially extends around the end of said first electrode, to increase the electric field adjacent said first electrode.

17. An improved ionization chamber for efficient detection of radiation with minimum temperature coefficient, comprising a metallic housing, a gas sealed in said housing, a number of first and second electrodes each having opposite sides of large surface area and ends of small width dimension, means for supporting said first and second electrodes in a stack in said housing, alternating with first one of said first electrodes then one of said second electrodes, with said large surface areas being parallel, the ends of each of said electrodes being opposite said housing, power source means connecting said housing and said first electrodes to one potential, and for connecting said second electrodes to another potential, the potentials being different to establish a region between said first and second electrodes for saturation operation, each of said first electrodes having at least one lip completely around the circumference and at least partially embracing the end of an immediately adjacent second electrode, to maintain a high electric field sufficient for saturation operation at the end of said immediately adjacent second electrode.

18. An ionization chamber for efficient detection of radiation with minimum temperature coefficient, comprising a metallic cylindrical housing; a gas sealed in said housing; a signal electrode having a flat, circular shape; a flat, circular voltage electrode having at least one projecting lip completely around the circumference, each of said electrodes having opposite sides of large surface area and ends of small width dimension; means for supporting said signal and voltage electrodes spaced apart in a stack within said housing, with a voltage electrode at opposite ends of the stack, said voltage electrodes being electrically connected to said housing, an electrical terminal mounted on and insulated from said housing and connected to each of said signal electrodes, power source means connected to said housing and terminal to provide a potential difference sufficient for saturation operation between said signal and voltage electrodes, said voltage and signal electrodes being so arranged that said signal electrode is at least partially embraced by said lips of immediately adjacent voltage electrodes lying at least partially between said housing and said signal electrode to retain a high electric field sufficient for saturation operation around the end of said signal electrodes.

19. An ionization chamber, as described in claim 18, wherein, said voltage electrodes at the ends of said electrode stack have a single lip at least partially extending between the respective adjacent signal electrodes and said housing to maintain a high electric field for saturation operation around the end of each of said adjacent signal electrodes, and said other voltage electrodes comprise two lips completely around the circumference, each lip projecting at least partially between one of the immediately adjacent signal electrodes and said housing to maintain a high electric field for saturation operation around the end of said adjacent signal electrode.

20. An ionization chamber, as described in claim 18, wherein, each of said voltage electrodes, except at the ends of said electrode stack, comprise two circular discs held in electrical contact back-to-back with lips completely around the circumference on each disc projecting in opposite directions to at least partially embrace the immediately adjacent signal electrode, and each of said voltage electrodes at the ends of said stack is a circular disc with a lip completely around the circumference that at least partially embraces the immediately adjacent signal electrode, to maintain a high electric field for saturation operation around the end of each of said adjacent signal electrodes.

21. A method of reducing the temperature coefficient of an ionization-type radiation detector having at least two electrodes spaced apart in a metallic casing of a sealed chamber, an ionizable gas within the casing, the electrodes to be at different potentials and to be connected to a utilizing device, one of said electrodes being at the same potential as said casing, comprising the steps of applying a potential difference between said electrodes sufficient for saturation operation, and increasing the electric field at the end of the electrodes adjacent said casing to decrease the temperature coefficient.

22. A method, as described in claim 21, wherein, said potential difference is increased to reduce recombination in the region between said casing and said other electrode.

23. A method, as described in claim 21 wherein, the spacing between said casing or one electrode and said other electrode is adjusted to reduce recombination in the region between said casing and said other electrode.

24. A method of reducing the temperature coefficient of an ionization-type radiation detector having two or more electrodes spaced apart in a sealed, ionizable gas filled chamber and to be at different potentials and to be connected to a utilizing device, comprising the steps of applying a potential difference between said electrodes, and increasing the electric field adjacent the ends of said electrodes to decrease the temperature coefficient.

References Cited
UNITED STATES PATENTS

| | | | |
|---|---|---|---|
| 2,397,074 | 3/1946 | Hare et al. | 250—83.6 X |
| 2,601,334 | 6/1952 | Siegert et al. | 250—83.6 |

RALPH G. NILSON, *Primary Examiner.*

A. B. CROFT, *Assistant Examiner.*